United States Patent [19]
Lee

[11] Patent Number: 5,975,705
[45] Date of Patent: Nov. 2, 1999

[54] LCD POSITION DETERMINATION APPARATUS FOR LCD PROJECTOR

[75] Inventor: Jong-Jin Lee, Seoul, Rep. of Korea

[73] Assignee: Hyundai Electronics Industries, Co., Ltd., Rep. of Korea

[21] Appl. No.: 08/969,895

[22] Filed: Nov. 13, 1997

[30] Foreign Application Priority Data

Nov. 20, 1996 [KR] Rep. of Korea ................... 96-55636

[51] Int. Cl.⁶ .................................................. G03B 21/14
[52] U.S. Cl. ................................................. 353/31; 353/99
[58] Field of Search ................................. 353/31, 69, 70, 353/119, 101, 99, 98, 121; 349/5; 348/745

[56] References Cited

U.S. PATENT DOCUMENTS

| | | |
|---|---|---|
| 4,408,345 | 10/1983 | Yashiro et al. . |
| 4,461,032 | 7/1984 | Skerlos ........................................ 455/4 |
| 4,558,358 | 12/1985 | Onda ........................................... 455/5 |
| 5,092,671 | 3/1992 | Van Os ...................................... 353/31 |
| 5,099,348 | 3/1992 | Huddleston et al. ................... 359/143 |
| 5,303,085 | 4/1994 | Rallison ................................... 359/631 |
| 5,329,364 | 7/1994 | Lee ........................................... 348/11 |
| 5,341,216 | 8/1994 | Hoffart ....................................... 345/1 |
| 5,355,188 | 10/1994 | Biles et al. ............................... 353/69 |
| 5,512,967 | 4/1996 | Bohannon ................................ 353/31 |
| 5,537,168 | 7/1996 | Kitagishi et al. ......................... 353/69 |
| 5,548,357 | 8/1996 | Appel et al. .............................. 353/69 |
| 5,594,726 | 1/1997 | Thompson .............................. 455/5.1 |
| 5,653,522 | 8/1997 | Loucks ..................................... 353/31 |
| 5,743,611 | 4/1998 | Yamaguchi et al. ..................... 353/31 |

*Primary Examiner*—William Dowling
*Attorney, Agent, or Firm*—R. Neil Sudol; Henry D. Coleman

[57] ABSTRACT

An LCD position determination apparatus for an LCD projector which is capable of shortening an assembling time of a projector by facilitating or enabling alignment of the red (R), green (G) and blue (B) cells by detecting the positions of the R, G and B LCDs at the same time when installing the R, G and B LCDs at or along three surfaces of a prism. The apparatus includes the red LCD, green LCD and blue LCD optically aligned with three respective surfaces of the color mixing prism, a pair of two-way splitting mirrors aligned with a fourth surface of the prism, and an automatic collimator apparatus having an ocular lens by which an image of a predetermined corner portion of each of the LCDs transmitted via the two-way mirrors is viewed.

4 Claims, 4 Drawing Sheets

LCD POSITION DETERMINATION APPARATUS FOR LCD PROJECTOR

BACKGROUND OF THE INVENTION

1. Field of the Invention

The present invention relates to an LCD (Liquid Crystal Display) position determination apparatus for an LCD projector, and in particular, to an improved LCD position determination apparatus for an LCD projector which is capable of shortening an assembling time of a projector by facilitating adjustment or alignment of red (R), green (G) and blue (B) cells at an identical position by measuring the positions of R, G and B LCDs during installation of the LCDs at or along three surfaces of a prism.

2. Description of the Conventional Art

As shown in FIG. 1, the conventional prism type LCD projector includes a light source 1 generating a beam of white light, an ultraviolet and heat blocking filter 2 for blocking ultraviolet frequencies and heat from the light source 1, a micro-lens array unit 3 for uniformly concentrating light, a first color splitting filter 4 for passing red light and reflecting green and blue light, a second color splitting filter 5 for passing through blue light and reflecting green light, a condensing lens 6 for condensing or focusing light from the first color splitting filter 4, an LCD panel 7 having a plurality of cells forming a picture, a color mixing prism 8 fort red, green and blue colors, and a projection lens 9 for projecting the mixed light on a screen (not shown).

In the drawings, reference numeral 3a denotes a field lens, 3b denotes a relay lens, and 5a through 5d denote reflection mirrors.

In the conventional prism type LCD projector shown in FIG. 1, white light from the light source 1 is split into different colors. The images incident on the red, green and blue LCD panels 7 are mixed by the color mixing prism 8 and are projected on the screen using the projection lens Here, in the LCD projection apparatus, three LCD panels 7 are used for red (R), green (G) and blue (B) light, respectively, and when the three LCD panels are correctly installed, it is possible to project a fill color image accurately on the screen.

In conventional projectors, in order to overcome the above-described problems, the positions of the R, G and B LCD panels are adjusted using the images projected on a screen by the projection lens 9 provided as a unit. However, this method has the following problems.

In order to adjust the upper and lower portions the R, G and B image, the adjustment is performed after adjustment of other systems such as a lighting system, a circuit, etc. At this time, a position adjusting terminal attached to the LCD panel(s) is blocked by a circuit unit which is assembled to the upper portion of the projector, and it becomes impossible to adjust the upper, lower, left and right portions of the R, G and B image.

In addition, since thee is a predetermined distance between the position adjusting terminal and the screen, one user checks the adjusting position while viewing the screen and another user actually adjusts the LCD cells, so that at least two persons are required for adjusting the apparatus, thus requiring increased time and manpower.

Moreover, when the performances of the projection lens is poor, since the boundary between the neighboring cells is unclear, it is impossible to correctly adjust the positions of the cells.

In another method for overcoming the above-described problems, the positions of the cells are measured or adjusted one corner at a time using a microscope or an automatic collimator. In this method, since only R, G and B image of one side is viewed through the ocular lens or eyepiece, the upper and lower right corners and the lower left corner of the cells are misaligned when adjusting the upper left corner as shown in FIG. 2. When adjusting the upper right corner as shown in FIG. 3, the upper left, lower left and lower right corners are misaligned.

SUMMARY OF THE INVENTION

Accordingly, it is an object of the present invention to provide an improved LCD position determination apparatus for an LCD projector which overcomes the aforementioned problem encountered in the conventional art.

It is another object of the present invention to provide an improved LCD position determination apparatus for an LCD projector which is capable of shortening an assembling time of a projector by facilitating an optical alignment of red, green and blue calls by measuring the positions of R, G and B LCDs during installation of the LCDs at or along three surfaces of a prism.

In brief, the present invention achieves the above objects by providing an apparatus which generates an observable composite image of corresponding portions of the red (R), green (G) and blue (B) LCD panels, wherein the relative positions of the component images of the different LCD panels in the composite image are controllable to facilitate determination or measurement of the mutual alignment of the LCD panels. Accordingly, in an LCD type color projector, an apparatus for determining alignment of multiple LCD panels and associated red, green and blue image components of a color image comprises, in accordance with the present invention, a color mixing prism, a red LCD, a green LCD, a blue LCD, a plurality of reflecting mirrors an ocular lens or eyepiece, and a mirror adjustment mechanism. The red LCD is disposed adjacent to and in optical alignment with a first surface or face of the prism, the green LCD is disposed adjacent to and in optical alignment with a second surface or face of the prism, and the blue LCD is disposed adjacent to and in optical alignment with a third surface or face of the prism. The reflecting mirrors are disposable at an angle relative to one another and in optical alignment with a fourth surface or face of the prism so as to reflect an image of a predetermined corner portion of each of the red LCD, the green LCD, and the blue LCD. The ocular lens or eye piece is disposed along an optical path including the prism and the reflecting mirrors for displaying to a user a composite image of the predetermined corner portions of the red LCD, the green LCD, and the blue LCD as reflected by the reflecting mirrors. The mirror adjustment mechanism is operatively connected to the reflecting mirrors for adjusting the angle to control relative positions of the images of the predetermined corner portions of the red LCD, the green LCD, and the blue LCD in the composite image.

In accordance with another feature of the present invention, the apparatus further comprises an objective lens disposed in the optical path between the reflecting mirrors and the prism. The objective lens is preferably mounted in a tap to enable replacement of the objective lens by another lens having a different focal length.

In accordance with a further feature of the present invention, the mirror adjusting mechanism is operatively connected to at least one of the reflecting mirrors for moving that reflecting mirror.

Additional advantages, objects and other features of the invention will be set forth in part in the description which follows and in part will become apparent to those having ordinary skill in the art upon examination of the following or may be learned from practice of the invention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
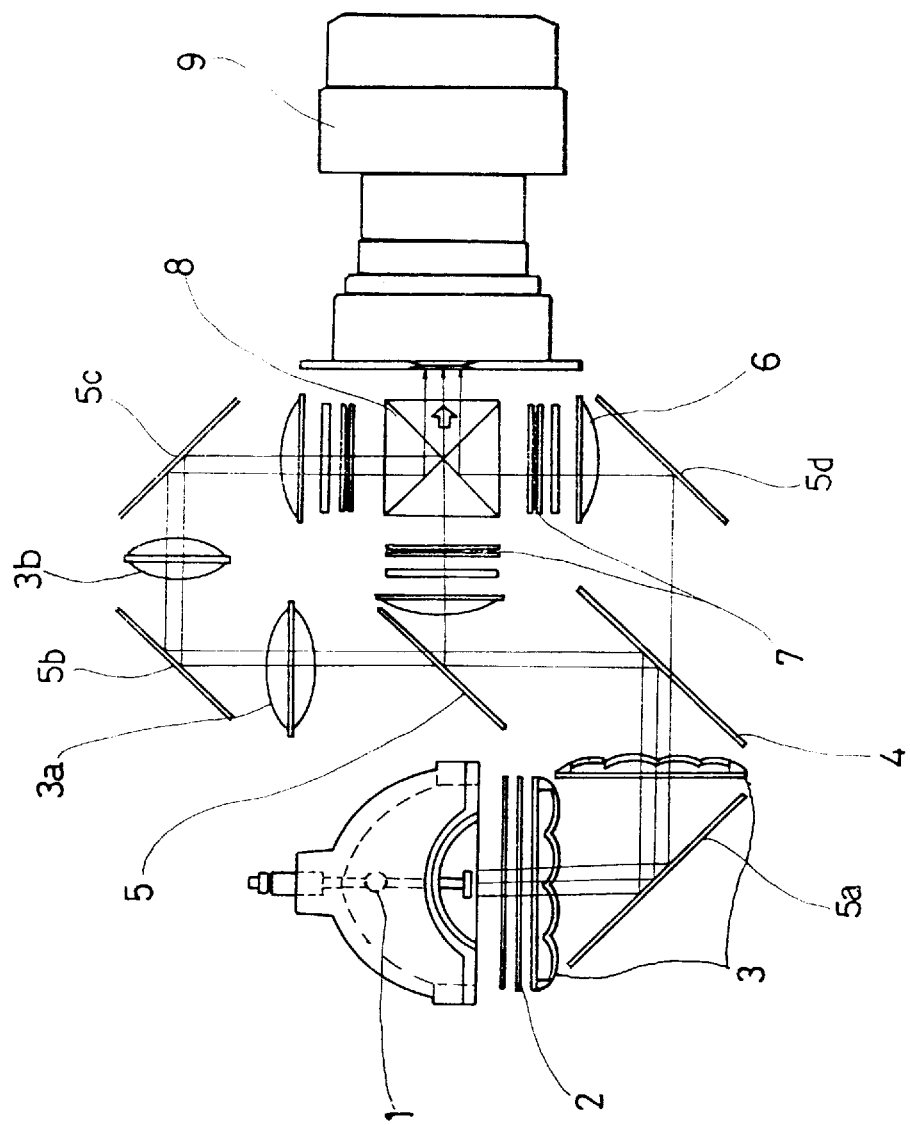
FIG. 1 is a schematic view illustrating a conventional LCD projector.
Figure 2:
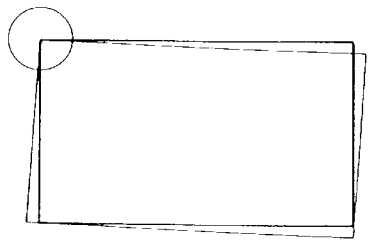
FIGS. 2 and 3 are views illustrating cells which are rotated at one corner of each of the cells in the conventional LCD projector.
Figure 3:
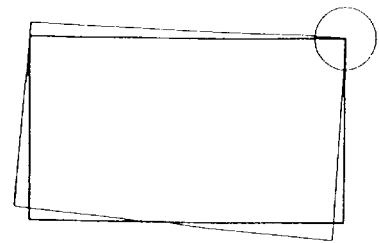
Figure 4:
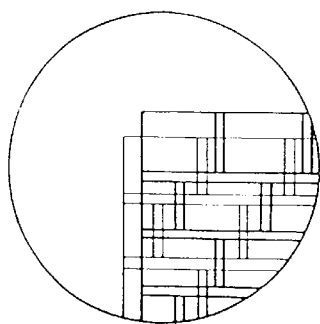
FIG. 4 is a view illustrating a position of an LCD cell as viewed through the eyepiece of a conventional automatic collimator.
Figure 5:
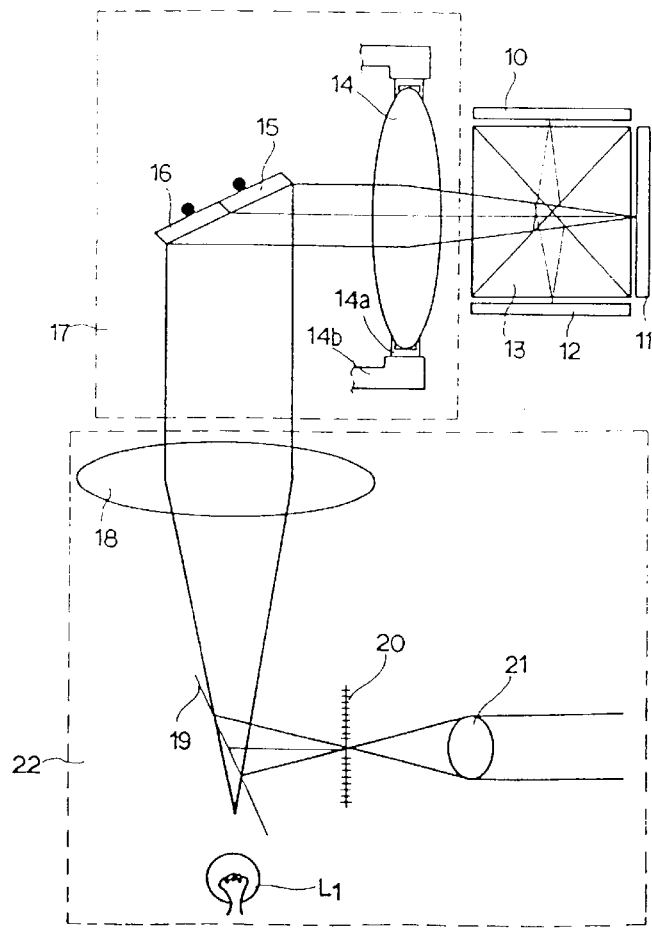
FIG. 5 is a schematic view illustrating an LCD position determination apparatus for an LCD projector according to the present invention.

FIG. 5 is a schematic view illustrating an LCD position determination apparatus for an LCD projector.

As shown therein, an R-LCD 10, a G-LCD 11 and a B-LCD 12 are disposed adjacent to and optically aligned with respective surfaces of a color mixing prism 13 so as to substantially surround the prism. At a surface of the prism 13 not having an adjacent or justaposed LCD panel, a two-way splitting mirror adjusting apparatus 17 is installed. The angle of that apparatus 17 is adjusted by a stepping motor 31 (FIG. 6), which is separately driven according to a mirror adjustment determination. The two-way splitting mirror adjusting apparatus 17 includes an objective lens 14, a first mirror 15, and a second mirror 16.

Here, the objective lens 14 is fixed by a tap 14a installed so that the objective lens may be removed and replaced by another lens having a different focusing distance.

In addition, an automatic collimator 22 includes a collimator lens 18, a semi-transmitting mirror 19, a scale plate 20, and an ocular lens or eyepiece 21 so that light from the first and second mirrors 15 and 16 of the two-way splitting mirror adjusting apparatus 17 may be viewed through the ocular lens.

In the drawings, reference character L1 denotes a light source which produces white light containing R, G and B light components.

Assuming that the first and second mirrors 15 and 16 of the two-way splitting mirror adjusting apparatus 17 are aligned along a straight line or plane as shown in FIG. 5, the image from the ocular lens 21 presents the cells of the R-LCD 10, the G-LCD 11 and the B-LCD 12 in a folded or overlapping configuration.

Therefore, when viewing through the ocular lens 21 of the automatic collimator 22, since the entire portion of the center cell of the R-LCD 10, the G-LCD 11 and the B-LCD 12 are viewed, it is difficult to adjust the LCD panels 10, 11, 12.

Figure 6:
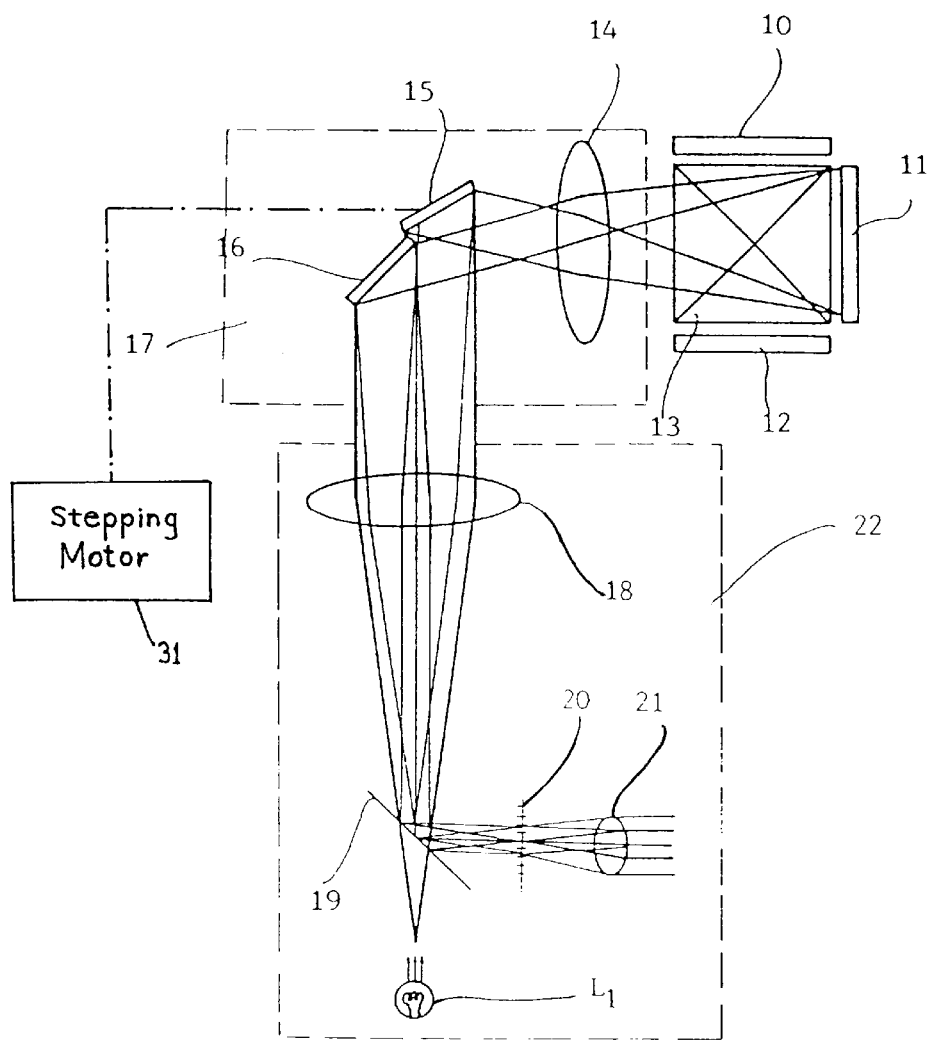
FIG. 6 is a view illustrating the positions of two-way splitting mirror according to the present invention.

As shown in FIG. 6, when the angles of the first mirror 15 and the second mirror 16 are changed by the stepping motor 31 in response to actuation of a predetermined switch (not shown), it is possible to correctly adjust the R-LCD 10, the G-LCD 11 and the B-LCD 12.

During such an adjustment procedure, the light from the light source L1 passes through the collimator lens 18, is reflected by the first and second mirrors 15 and 16 and falls on or illuminates the R-LCD 10, the G-LCD 11 and the B-LCD 12, respectively, through the objective lens 14 and the color mixing prism 13. At this time, light from the left corners of the LCDs 10, 11, 12 passes through the color mixing prism 13 and the objective lens 14 and is focused on the lower portion of the ocular lens 21 through the second mirror 16, the collimator lens 18 and the ocular lens 21, respectively.

The color mixing prism 13, for example, has a design characteristic that the red color or wavelengths of the incident white light is reflected to the R-LCD 10 and the green light component passes through the same. In addition, the red color light is reflected to the B-LCD 12 and the green light component passes through the same and advances to the G-LCD 11.

In addition, the light which is made incident on the right corner of each of the LCDs 10 through 12 is focused on the upper portion of the ocular lens 21 through the color mixing prism 13, the objective lens 14, the first mirror 15, the collimator lens 18 and the semi-transmitting mirror 19, respectively.

Figure 7:
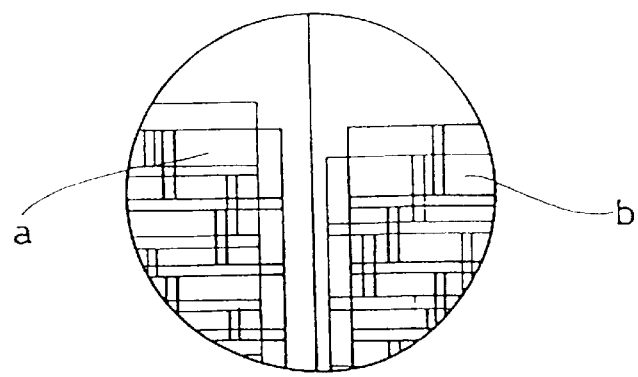
FIG. 7 is a view illustrating the positions of two corners of an LCD cell which is viewed through an eyepiece according to the present invention.

Therefore, when one is viewing through the ocular lens 21, the image focused on the left corner (portion "a") of each of the LCDs and the image focused on the right corner (portion "b"), as shown in FIG. 7, are concurrently viewed. When one is viewing through the ocular lens 21, if the cell of the G-LCD 11 and the cell of the R-LCD 10 which are installed on the left corner and right corner, respectively, are misaligned, it is possible to easily adjust the upper, lower, left and right positions of each of the LCDs 10, 11, 12 at the same time.

Here, the angles of the first minor 15 and the second mirror 16 are correctly adjusted by the stepping motor 31, respectively.

In addition, a signal processing apparatus such as an LCD driving circuit (not shown) and a signal control apparatus (not shown) for outputting a center signal to the center portions of the LCDS are provided. Therefore, it is possible to adjust the upper and lower, left and right positions of each of the LCDs 10, 11, 12 through the automatic collimator 22 while viewing the above-described signal.

Figure 8:
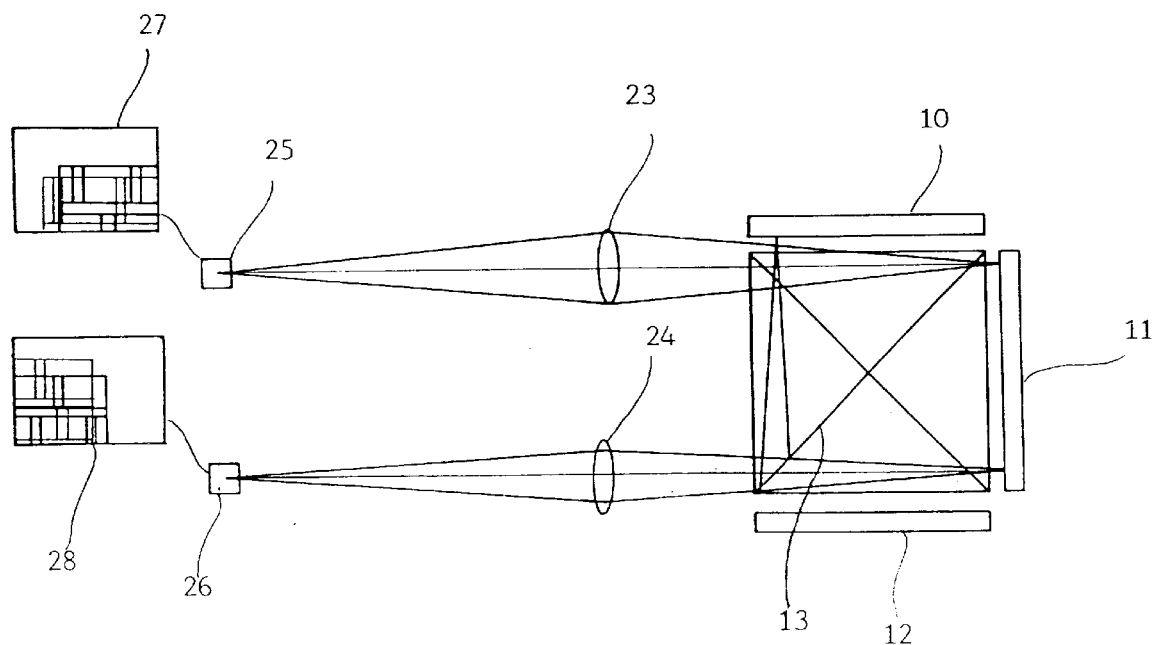
FIG. 8 is a view illustrating an LCD position determination apparatus for an LCD projector according to a first embodiment of the present invention.

In another embodiment of the present invention, as shown in FIG. 8 illustrating an LCD position determination apparatus for an LCD projector, two microscopes 23 and 24 are installed between first and second CCDs (Charge Coupled Devices) 25 and 26 and the prism 13. Therefore, the left corner of each of the LCDs 10, 11, 12 is viewed on a first monitor 27 through the first microscope 23 and the first CCD 25 and the right corner of each of the LCDs 10, 11, 12 is viewed on a second monitor 28 through the second microscope 24 and the second CCD 26, whereby it is possible to adjust the upper and lower, left and right positions of each of the LCDs while viewing the screens of the first and second monitors 27 and 28 on which the left and right corners of each of the LCDs are displayed.

Figure 9:
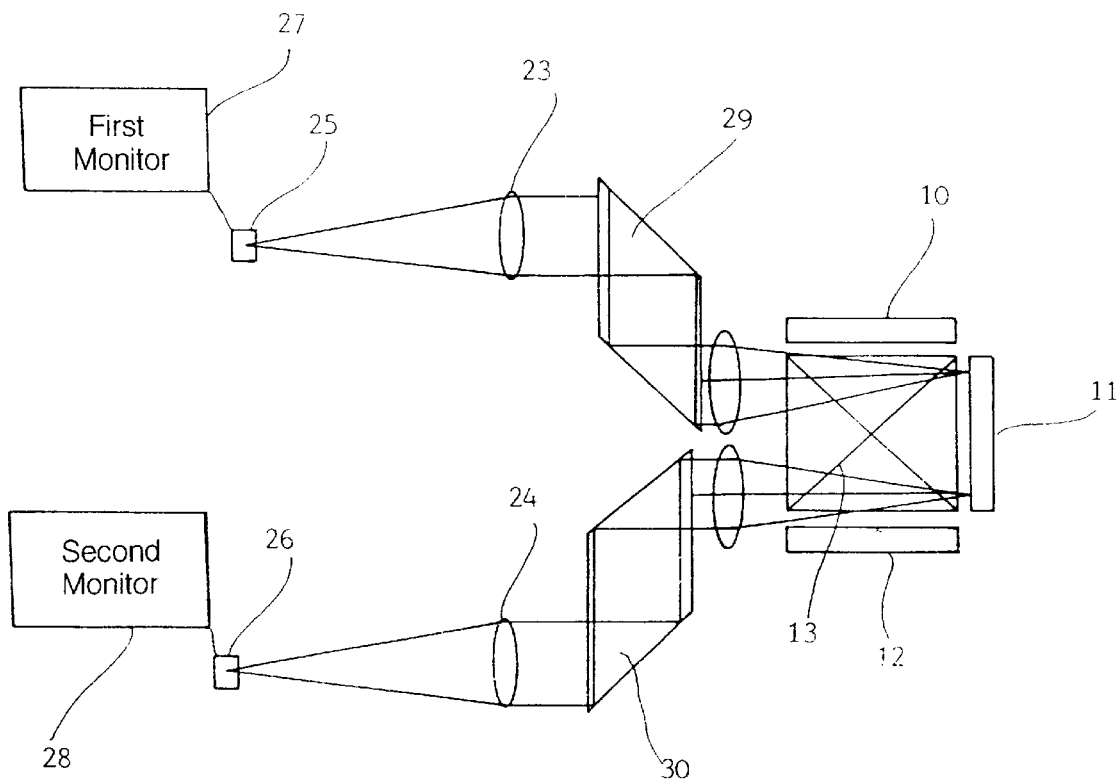
FIG. 9 is a view illustrating an LCD position dee on apparatus for an LCD projector according to a second embodiment of the present invention.

Another embodiment of the present invention, shown in FIG. 9, is similar to the embodiment shown in FIG. 8 except for the following construction. A first prism 29 and a second prism 30 are installed between the first and second microscopes 23 and 24 and the color mixing prism 13.

In the embodiment of FIG. 8, when there is a small distance between the left portion and right portion of each LCD 10, 11, 12, the bodies of the first and second microscopes 23 and 24 may be collide. In the embodiment of FIG. 9, the first prism 29 and the second prism 30 are installed between fist and second microscopes 23 and 24 and the color mixing prism 13. Prisms 29 and 30 enable a separation of the microscopes 23 and 24. In addition, the measuring distance may be shortened using the internal reflection of the first and second prisms 29 and 30.

The images of the upper and lower, left and right corners of each of the LCDs 10 through 12 pass through the color mixing prism 13, are filly reflected by the first and second prisms 29 and 30 and are viewed on the first and second monitors 27 and 28 through the first and second microscopes 23 and 24 and the first and second CCDs 25 and 26. Therefore, the corner positions of each of the LCDs 10 through 12 are adjusted while viewing the images on the first and second monitors 27 and 28.

As described above, in the present invention, the two-way splitting mirror 15, 16 id used, so that a left upper corner portion and a right upper corner portion of each of the LCDs 10, 11, 12 may be concurrently checked. In addition, it is possible to adjust the positions of the LCDs 10, 11, 12 simultaneously or in one adjustment operation, thereby increasing the accuracy of the assembling of the projector and reducing the assembling time.

Although the preferred embodiments of the present invention have been disclosed for illustrative purposes, those skilled in the art will appreciate that various modifications, additions and substitutions are possible, without departing from the scope and spirit of the invention.

What is claimed is:

1. In an LCD type color projector, an apparatus for determining alignment of multiple LCD panels and associated red, green and blue image components of a color image, comprising:

a color mixing prism;

a red LCD disposed adjacent to and in optical alignment with a first surface or face of said prism;

a green LCD disposed adjacent to and in optical alignment with a second surface or face of said prism;

a blue LCD disposed adjacent to and in optical alignment with a third surface or face of said prism;

a plurality of reflecting mirrors disposable at an angle relative to one another and in optical alignment with a fourth surface or face of said prism so as to reflect an image of a predetermined corner portion of each of said red LCD, said green LCD, and said blue LCD;

an ocular lens or eye piece disposed along an optical path including said prism and said reflecting mirrors for displaying to a user a composite image of the predetermined corner portions of said red LCD, said green LCD, and said blue LCD as reflected by said reflecting mirrors; and a mirror adjustment mechanism operatively connected to said reflecting mirrors for adjusting said angle to control relative positions of the images of said predetermined corner portions of said red LCD, said green LCD, and said blue LCD in said composite image.

2. The apparatus of claim 1, further comprising an objective lens disposed in said optical path between said reflecting mirrors and said prism.

3. The apparatus of claim 2 wherein said objective lens is mounted in a tap to enable replacement of said objective lens by another lens having a different focal length.

4. The apparatus of claim 1 wherein said mirror adjusting mechanism operatively connected to at least one of said reflecting mirrors for moving said one of said reflecting mirrors.

* * * * *